(12) United States Patent
Qian et al.

(10) Patent No.: US 10,177,942 B2
(45) Date of Patent: Jan. 8, 2019

(54) BLIND IDENTIFICATION OF TRANSMISSION STRUCTURE IN A WIRELESS COMMUNICATIONS SYSTEM

(71) Applicants: ZTE Corporation, Shenzhen, Guangdong (CN); ZTE Canada Inc., Toronto (CA)

(72) Inventors: Xing Qian, Conestogo (CA); LiJuan Zhao, Guangdong (CN); JunLing Zhang, Guangdong (CN)

(73) Assignees: ZTE Corporation, Shenzhen (CN); ZTE Canada Inc., Toronto (CA)

( * ) Notice: Subject to any disclaimer, the term of this patent is extended or adjusted under 35 U.S.C. 154(b) by 0 days.

(21) Appl. No.: 15/849,551

(22) Filed: Dec. 20, 2017

(65) Prior Publication Data

US 2018/0176048 A1 Jun. 21, 2018

(30) Foreign Application Priority Data

Dec. 21, 2016 (WO) ................ PCT/CN2016/111342

(51) Int. Cl.
*H04B 15/00* (2006.01)
*H04L 25/03* (2006.01)
(Continued)

(52) U.S. Cl.
CPC ...... *H04L 25/03019* (2013.01); *H04J 11/005* (2013.01); *H04J 11/0023* (2013.01);
(Continued)

(58) Field of Classification Search
CPC ............... H04W 72/042; H04W 72/12; H04W 72/0446; H04W 72/1289; H04W 48/12; H04W 72/08; H04W 72/085; H04W 40/16; H04L 5/0048; H04L 25/067; H04L 1/0048; H04L 1/0054; H04L 25/03305; H04L 5/0073; H04L 5/0007; H04L 25/0238; H04L 25/03019; H04B 7/0452; H04B 17/345; H04B 1/10; H04B 7/0473; H04J 11/0026; H04J 11/0079; H04J 11/0059; H04J 11/0023; H04J 11/005; Y02D 70/1262; Y02D 70/1264

See application file for complete search history.

(56) References Cited

U.S. PATENT DOCUMENTS

2016/0219599 A1* 7/2016 Lee ..................... H04B 7/0486

* cited by examiner

*Primary Examiner* — Rahel Guarino
(74) *Attorney, Agent, or Firm* — Perkins Coie LLP

(57) ABSTRACT

A wireless data reception method for receiving orthogonal frequency division multiplexing (OFDM) signal includes determining that an interfering signal is present, along with a serving cell signal, in the OFDM signal on the shared downlink channel, determining an estimate of a transmission structure of the received interfering signal, wherein the transmission structure is defined by a plurality of transmission parameters, classifying the estimate of the transmission structure as belonging to a subgroup from a plurality of possible subgroups in a dynamic order, estimating, in a priority order, at least some of the plurality of transmission parameters of the estimate of the transmission structure, and performing further receiver-side processing of the serving cell signal by subtracting contribution of the interfering signal from the OFDM signal based on the estimate of the transmission structure and a result of the estimating step.

27 Claims, 6 Drawing Sheets

(51) Int. Cl.
*H04J 11/00* (2006.01)
*H04L 25/02* (2006.01)
*H04L 5/00* (2006.01)
(52) U.S. Cl.
CPC ........ *H04L 5/0073* (2013.01); *H04L 25/0238* (2013.01); *H04L 5/0007* (2013.01)

BLIND IDENTIFICATION OF TRANSMISSION STRUCTURE IN A WIRELESS COMMUNICATIONS SYSTEM

CROSS REFERENCE TO RELATED APPLICATIONS

This patent document claims the benefit of priority under 35 U.S.C. § 119(a) and the Paris Convention of International Patent Application No. PCT/CN2016/111342, filed on Dec. 21, 2016. The entire content of the before-mentioned patent application is incorporated by reference as part of the disclosure of this patent document.

TECHNICAL FIELD

This patent document relates to digital signal processing in a wireless signal receiver.

BACKGROUND

As the number of wireless user devices increases, so does the use of spectrum for wireless transmissions. Often, signals from multiple communication networks are receivable at locations, especially densely populated areas and public places. Many traditional data reception techniques are not adequately able to handle situations where interferences from other neighboring devices and networks may degrade the quality of a desired signal being received.

SUMMARY

This patent document describes technologies, among other things, for a complexity-reduced method for blindly identifying the transmission structure of an interfering signal. This technique can be used for pre-processing when reconstructing a signal at a receiver with interference cancellation (IC) capability, especially for a network assisted interference cancellation system (NAICS) receiver, such as one described by the third generation partnership project (3GPP) in Long Term Evolution (LTE-A) Release 12.

In one aspect, a method of wireless signal processing, performed at a receiver in a wireless network, is disclosed. The method includes receiving, by a wireless receiver, an orthogonal frequency division multiplexing (OFDM) signal on a shared downlink channel from the wireless network, determining that an interfering signal is present, along with a serving cell signal, in the OFDM signal on the shared downlink channel, determining an estimate of a transmission structure of the received interfering signal, wherein the transmission structure is defined by a plurality of transmission parameters, classifying the estimate of the transmission structure as belonging to a subgroup from a plurality of possible subgroups in a dynamic order, estimating, in a priority order, at least some of the plurality of transmission parameters of the estimate of the transmission structure, and performing further receiver-side processing of the serving cell signal by subtracting contribution of the interfering signal from the OFDM signal based on the estimate of the transmission structure and a result of the estimating step.

In another example aspect, a computer readable program medium storing computer-executable instructions is disclosed. The instructions, when executed by a processor of a wireless receiver, cause the wireless receiver to implement the above described method.

In some embodiments, the dynamic order for classifying the estimated transmission structure is determined at run-time depending on a transmission structure estimation outcome of signals received in a previous transmission time interval.

In an embodiment, the priority order for the estimating step is responsive to a sensitivity of results of the estimating step with respect to the plurality of transmission parameters.

In some embodiments, the classifying step comprises comparing similarity between signal power received on antennas of the receiver with entries from a look-up table, wherein the entries from the look-up table include simulated cross-correlations between combination of pre-coding vectors used for signal transmission in the wireless network.

In some aspects, the performing the further receiver-side processing includes performing a symbol-level interference cancellation (SLIC) algorithm.

In some embodiments, the plurality of transmission parameters includes any one or more of a parameter that is configured by a higher layer message, a parameter that is dynamically signaled during a data transmission session and a parameter that is related to a network operator's deployment.

In some aspects, the estimating of at least some of the plurality of transmission parameters includes estimating a modulation scheme of the received interfering signal by performing blind estimation to estimate constellation points of received data symbols.

In some embodiments, the serving cell signal comprises a reference signal known a priori to the receiver.

In an embodiment, the determining the estimate of the transmission structure includes using a difference between an average power of symbols received at different antenna ports of the receiver.

These general and specific aspects may be implemented using a system, a method or a computer program, or any combination of systems, methods, and computer programs.

Details of the above aspects and their implementations are set forth in the accompanying drawings, the description and the claims.

DETAILED DESCRIPTION

Figure 1:
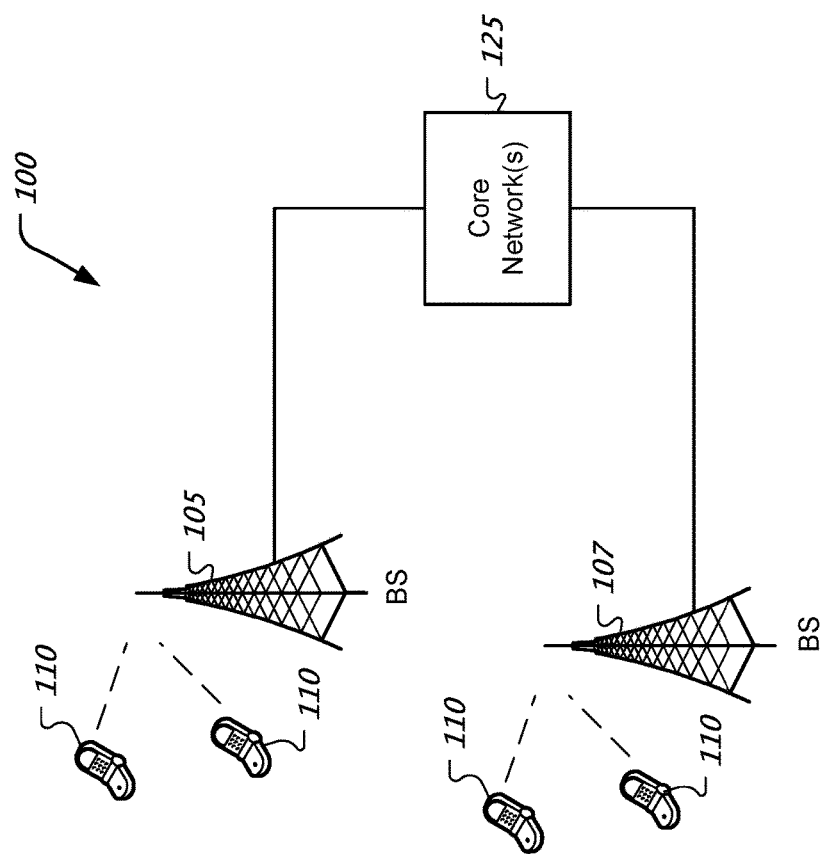
FIG. 1 shows an example of a wireless communication system.

Wireless data service requirement has been tremendous growing in recent years due to new generation of wireless gadgets, e.g., smartphone, tablet and also due to fundamental evolution of application from being voice and data-centric to multimedia-centric. In order to cope with the exponential growth of data services, we need more flexible and aggressive spectrum management and improve cell spectral efficiency. It is shown that spatial frequency reuse by adding more cells offers a larger capacity gain compared to the increased spatial order or increased spectral bandwidth. LTE-Advanced and beyond are expected to utilize frequency spectrum efficiency by using small cell technology and is designed with so-called frequency reuse of one where all the cells use the same frequency. In practice, using the same frequency band in neighboring cells will cause high levels of inter-cell interference especially at cell edges. Consequently, high levels of interference, low SINR and poor receiver performance can be expected for near the cell-edge user equipment (UE). In this context, most of the recent wireless systems are interference limited rather than noise limited.

Understanding and mitigating interference is useful to the performance improvement for deploying wireless networks. In general, the interfering signals comprise intra-cell interference signals and/or inter-cell interfering signals. Intra-cell interference comes from Multi-User Multiple Input Multiple Output (MU-MIMO) transmission to other UEs in the same serving cell as the victim UE. Inter-stream interference can arise due to the non-orthogonality of spatial MIMO streams dedicated to the same UE, which can be called single user MIMO interference; and inter-user interference can arise between UEs served in the same cell and sharing the same resource, which can be called MU-MIMO interference. Interference may also happen among UEs located in different cells, which can be referred to as inter-cell interference. Cancelling or suppressing the interference may greatly improve both the cell capacity and coverage for interference limited system. MU-MIMO related intra-interference could be avoided at eNodeB by using feedback channel state information. The inter-cell interference issues are usually addressed by means of frequency domain Inter-Cell Interference Coordination schemes (ICIC) in LTE/LTE-A. Some ICIC methods are already feasible with Release 8/9 of the LTE standard.

Compared with the coordination at transmission side, the inter-stream interference can also be suppressed or eliminated at the receiver side to provide significant performance gains. For example, the inter-stream interference of serving cell can be eliminated with Successive IC (SIC) algorithm. The SIC algorithm for inter-stream interference mitigation has been widely used for practical system. Receiver-based solutions for the downlink interference-limited system have been specified in Release 11. Interference Rejection Combining (IRC) effectively performs Linear minimum mean square error (LMMSE) filtering of the received signal to reduce the contribution of the interference in spatial domain. It has been shown that IRC achieves the best performance-complexity trade-off. However under higher interference levels, a significant performance loss of the IRC compared to the Interference-Aware Receiver (IAR) was observed. To achieve effective interference mitigation at the UE, an optimal simplified IAR based on the ML criterion has been investigated recently. The basic idea is that the near interference-free performance could be achieved if the UE receiver is capable of decoding and subtracting the interfering data stream successively, e.g., inter-cell codeword cancellation. However, information about the interfering modulation and coding scheme and resource allocation, etc., is required, which is unavailable to the UE. To overcome this disadvantage of the IAR, an interference information estimator prior to the IAR had to be implemented.

Network assistance enables the use of more advanced receivers including aggressive non-linear structure which has achieved promising performance gains compared to Release 11—IRC under link-level simulation. NAICS, including Enhanced Linear-MMSE-IRC (E-LMMSE-IRC), SLIC, CWIC, and R-ML receivers, proposed by 3GPP in Release 12, has the potential advantages of providing additional information to the UE in order to support its IC abilities. Performance enhancements to intra-cell and inter-cell interference mitigation at receiver are demonstrated by exploring the degree of interference knowledge with possible assistance from the network. Although, the inter-cell CWIC can achieve the highest throughput among all schemes, it is dropped from the discussion due to its high complexity, and need few tighter parameters, such as coding schemes and the rule scrambling the bit stream of interference, which are very difficult to get at UE side. SLIC has the best performance-complexity trade-off with reasonable parameter requirement for interfering signal. In general, 3GPP uses SLIC algorithm as NAICS' baseline receiver for performance comparison.

In contrast to the approach of interference suppression where the interference is directly suppressed and treated as background noise, generally, there are two separate procedures for dealing with IC for NAICS receiver: interference information extraction and interference reconstruction from received signals. With full knowledge of interference, link-level simulations have shown that NAICS receiver with IC gives the significant performance improvements. However, different IC algorithms, based on different assumptions on the interferer's signal knowledge, may need different network-assisted information. It is therefore advantageous to obtain an accurate estimate of the interfering signal including the knowledge of its transmission structure and channel information before subtraction. Reliable estimation may thus achieve promising performance.

In the NAICS study item, various parameter candidates helpful for IC were identified. For example, parameters that are higher-layer configured per transmission session (e.g., transmission mode, cell-ID, MBSFN sub-frames, CRS antenna ports, $P_a/P_b$); parameters that are dynamical signaled during transmission session (e.g., CFI, PMI, RI, MCS, resource allocation, DMRS); and other deployment related parameters (e.g., synchronization, CP, sub-frame/slot alignment). Those parameters are typically not available at UE side. It is possible to let receiver blindly detect those parameters associated with the interfering signal without any aid of signaling, but the complexity could be impractical high. However, dynamic signaling all those parameters is also not feasible since interference characteristic may change per physical resource block (PRB) and per Transmission Time Interval (TTI). In addition, during NAICS operation, the serving base station not only still has to signals information to the UE for inter-cell information, but also for intra-cell information due to MU-MIMO transmission. Partial of those required parameters need to be blindly detected without or with a little bit network assistance. Generally, those parameters for receiver such as SLIC include the number of antenna ports, channel estimation, modulation schemes, TM, $P_a$, etc.

Blind estimation typically uses the correlation between the assumed data sent and received without knowing the information of the exact transmitted data. It uses specified algorithms and sufficient received samples to perform statistical analysis, and regression. For example, one objective of blind modulation detection is to determine the type of modulation scheme used within the received samples. The only empirical data provided by the received noisy samples is the distance to closest legitimate constellation point of all the used modulation schemes. Assuming all other parameters can be estimated reliably, the modulation scheme is detected with likelihood classification algorithm by calculating the differences of Euclidean distance between the received samples and all the legitimate constellation points of all possible modulation schemes.

In order to not limit the flexibility of scheduling at eNodeB, the interferer parameters are assumed to vary on a per-PRB pair granularity in the frequency and per-TTI in the time domain. Due to rapidly varying information content of physical channel, blind detection may suffer higher than expected complexity and lower than desired reliability. In addition, there are the worst-case limitations for the accuracy and reliability of blind detection due to the requirement of 3GPP that is NAICS should be able to enhance link and system level performance via advanced receiver processing, while ensuring robustness compared to Rel-11 receiver performance when gains are not available. The process of blindly detecting the interfering parameters can be a sensitive process as any parameter misdetection could lead to the incorrect identification of the inferring signal and might even bring a performance penalty in practical application, as cancelling the wrong information might have the effect of noise amplification. There is a conflicting need for systems and methods that increasing the reliability of the blind detection and at the same time have lower the complexity.

Wireless transmission schemes have several Transmission Mode (TM) options. For some TMs, such as TM4, both Pre-coding Matrix Indicator (PMI) and Rank Indicator (RI) are specified at the interfering transmitter. TM identification is a useful stage in any NAICS algorithm and is highly linked to the PMI and RI blind detection as the detection of PMI/RI indicates the TM. In general, it is difficult to directly identify the TM based simply on the receiving signals' characteristics. UE needs to do the iterative calculation procedure for each TM one by one. The PMI blind detection may typically be required only in cell-specific reference signals (CRS)-based modes because, for demodulation reference signal (DMRS)-based transmission, the UE estimates the effective channel and pre-coding is also applied on DMRS. To suppress error propagation, the TM should be incorporated, along with other parameters, for blind detection reliability. Those parameters (e.g., modulation scheme, RI/PMI) could be detected jointly in one Maximum Likelihood (ML) frameworks at same estimation loop usually.

A ML classifier may minimize the average probability of decision error with the assumption that the modes of allowed parameter combination have equal probabilities. Then modulation classification performs on it for each outcome. But the optimality comes with prohibitively high computational complexity due to large number of modes and need to be implemented on per-PRB and per TTI granularity in application. Intuitively, the complexity of blind detection generally increases, and the reliability of blind detection degrades with the number of parameters and the number of possible values of the parameters. Therefore, more complex downlink TM detection such as 4-port CRS, can potentially have higher complexity and lower detection reliability.

To reduce complexity, the TM (RI/PMI) and modulation scheme could be separated into two sequential steps. The identification of TM can be done via comparing the measured receiver signal covariance matrix on the data subcarriers with different reconstructed receive signal covariance matrix hypothesis derived in the assumption of using specific PMI and RI. It is beneficial for UE to reliably identify the actual TM and PMI/RI of the interfering signal. Its detection error will propagate through the rest of the blind detection chain and could cause significant performance degradation. In addition, the reliability of PMI/RI detection depends on multiple factors and may be relatively high for certain scenarios. Thus good interference channel estimation on data subcarrier is advantageous to achieve good blind detection performance.

Brief Summary

This document discloses a complexity-reduced method for blind identification of the transmission structure of an interfering signal. In some embodiments, the detection may be performed in the order starting with the most sensitive parameter first for optimal IC performance by taking a measure to avoid error propagation from less sensitive parameters, and prioritizing the achievable estimation accuracy of the most sensitive parameters. The transmission structure of TM is classified into several subgroup based on their similarity of PMI and transmission characteristics. In some embodiments, an averaged power of demodulated samples at two antenna ports after MIMO-equalizer hypothesis can be derived by the assumption of using specific pre-coding parameters (e.g., PMI or PMI/RI). The cross correlations between all possible two pre-coding vectors can also be pre-simulated and saved as a look-up-table. The similarity between the normalized powers from two antenna ports and pre-calculated cross correlation versus different TMs can be used as metrics for subgroup classification of TMs. In addition, the order of subgroup classification can be adapted dynamically based the blindly detected TM of previous TTI by taking advantage of possible correlation of TM scheduling between TTI in practical application to reduce the detection complexity without loss of performance.

The disclosed techniques can be useful in the context of the LTE-A standard as it is currently being discussed and decided. Due to spectrum scarcity, most of LTE/LTE-A deployments currently reuse the same carrier frequency across neighboring cells. In addition, Multi-User MIMO can be highly spectral efficient by serving more than one user for the same time and frequency resource. In this context, most of the recent wireless communication systems are interference limited rather than noise limited. In LTE-A Release-12 enhancements, advanced receiver with IC capability is proposed to be used in LTE-A system at cell-edge to combat with strong multi-cell interferences and improve system capacity compared with Release 11 IRC. The performance gain is achieved by increasing the degree of interfering transmission knowledge from blind parameter estimation with possible network-assistance. In order to realize the actual performance improvements in LTE-A systems, accuracy and reliable parameter estimation can be used to achieve IC effectively. For real-life deployed large-scale LTE network, channel condition, number of interfering sources generated from the surrounding time synchronized and/or unsynchronized cells change dynamically with time. Data transmission of interfering cell with dynamic ON/OFF statistical characteristic highly depends on the dynamic scheduling behavior in neighboring cells. So, IC of NAICS receiver would be sometimes feasible and sometime not, depending on the achievable degree of interfering transmission knowledge from blind parameter estimation.

In some embodiments disclosed in the present document, a complexity-reduced method for blindly detecting transmission structure (e.g., TM, RI/PMI) can be implemented by using the differences of averaged power of MIMO-equalized symbols from two receiver antenna ports, which are hypothesis derived in the assumption of using, for example, specific PMI and RI. It is approximately equivalent to use the cross-correlation between two pre-coding vectors of different TMs, as a metrics for identification. TMs can be divided into several subgroup based on their similarity of pre-coding and sensitivity to the performance of NAICS system. The expected power metrics from cross-correlation, which may be pre-calculated by off-line simulation, can be used as decision references to distinguish the subgroup of TMs and identification of TM follow sequentially with or without the help of modulation scheme detection. Detecting the most sensitive group parameter first makes it easier to determine the threshold and advantageously improves the blind detection performance from statistical characteristic of input samples without introduction of error propagation. The disclosed detection algorithm is much simpler to implement than the ML based joint detection and covariance matrix based approaches.

Example Embodiments

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
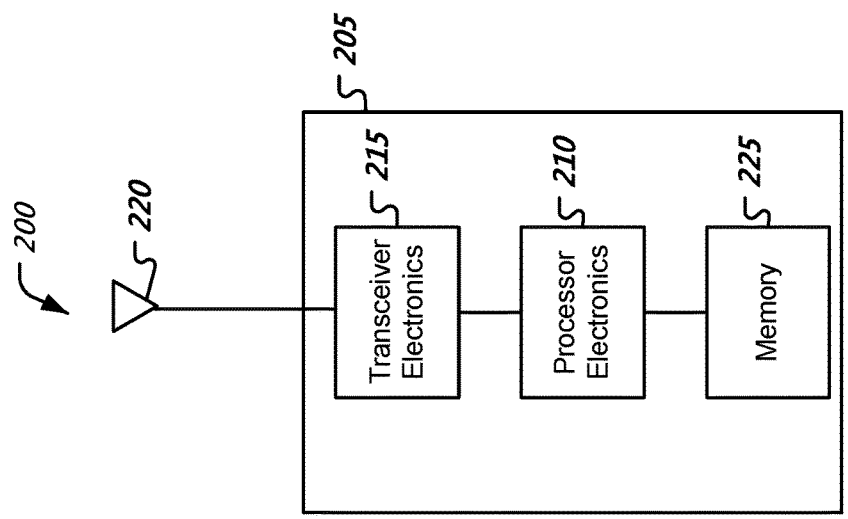
FIG. 2 shows an example of a wireless communication apparatus.

FIG. 2 shows an example of a radio transceiver station 200 for implementing a wireless device, a base station or other wireless communication modules. Various examples of radio stations include base stations and wireless devices in FIG. 2. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on an orthogonal frequency-division multiplexing (OFDM) air interface. In some implementations, radio stations 205 can communicate using one or more wireless technologies such as Wi-Fi, WiMAX, LTE, and LTE-A.

The disclosed techniques can be implemented on the radio station 205 and in the system depicted in FIG. 2.

Figure 3:
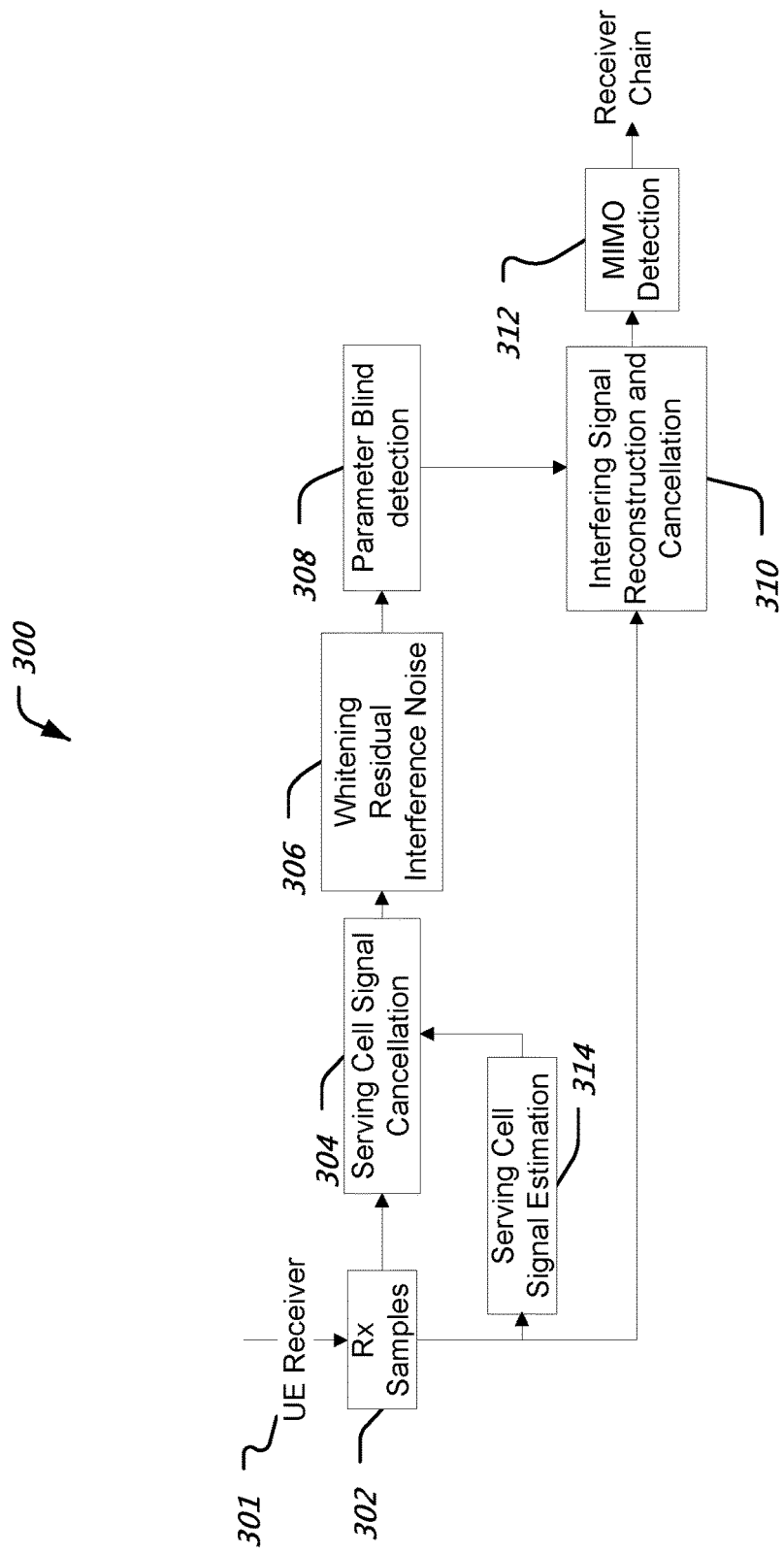
FIG. 3 is a block diagram showing an example of a wireless receiver apparatus.

FIG. 3 shows an example of a receiver data path 300 and blindly interfering information detection for typical NAICS system. A receiver front end 301 may receive signals at a receiver apparatus and generate samples 302 of the received signal by performing front end processing. For example, the front end processing may include one or more of the following functional blocks and operations: low noise amplifier, intermediate frequency down-conversion, analog to digital conversion, impedance matching, and so on.

The received samples 302 may be input to a serving cell signal estimation function 314. The function 314 may produce an estimate of the serving cell signal. The estimate may be subtracted from the received signal samples 302 by a serving cell signal cancellation function 304. The result of the cancellation may represent an estimated noise plus interference component of the received signal (represented by the stream of samples 302).

A whitening and residual interference noise function 306 may perform whitening operation on the estimated interference plus noise component to produce a whitened output signal. The whitened output signal may be fed into a blind parameter detection function 304. Various algorithmic implementation choices of the function 304 are disclosed throughout the present document. An interfering signal reconstruction and cancellation function 310 may receive the received samples and also receive the resulting parameters estimated by the blind detection function 308. The function 310 may reconstruct and cancel the contribution of the estimated interfering signal to generate a filtered received serving cell signal estimate, which may then be fed into the subsequent signal processing functions in the receiver apparatus for recovering the serving cell data. For example, this signal may be input to the MIMO detection function 312 of the rest of the receive chain operation of the receiver data path 300.

Figure 4:
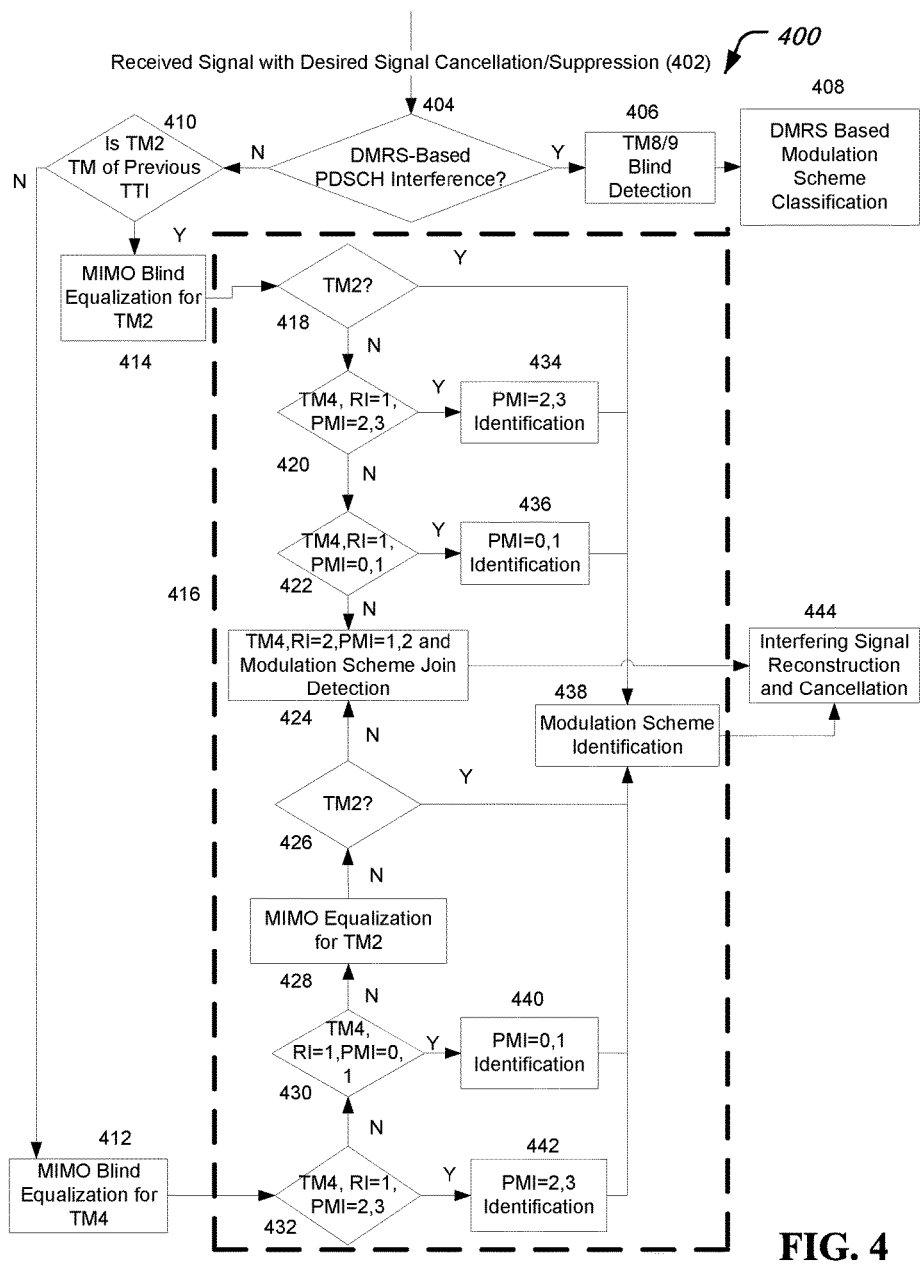
FIG. 4 shows a flowchart of an example process of blind estimation of transmission structure in a wireless communication receiver apparatus.

FIG. 4 is a flow chart representation of a method 400 of sequential identification. At 402, received signal from which a signal (for example, the serving cell signal) is cancelled is received by the method 400. At 404, a decision is made regarding whether to apply a hypotheses-based blind estimation technique described herein or whether the received signal is more amenable to a blind detection technique such as the TM8/9 blind detection technique. In some embodiments, at 404, a determination is made whether a desires signal includes a reference signal known a priori to the receiver. For example, a determination may be made (404) about the received signal includes a DMRS based PDSCH interference. If yes, then a blind detection technique such as specified by TM8 or TM9 is applied (406), and the resulting signal is processed by a DMRS based modulation scheme classification function 408.

If, at 404, the determination is a "no," then at 410, a decision is taken about whether to use blind equalization by assuming that TM2 is being used by the interfering signal, or whether to use blind equalization under the assumption that TM4 is being used by the interfering signal (410). To assist with this decision, a check is made whether the previous TTI's TM or TM2 is being used (410). If not, then MIMO blind equalization for TM4 is applied to the signal (412); otherwise MIMO blind equalization for TM2 is performed (414). The outputs of both 412 and 414 are used (at different entry points) as inputs to a process 416 in which various hypotheses are tested out for modulation scheme identification.

For example, in the depicted example of FIG. 4, a sequence of successive tests is performed for different hypothesis when the result of the previous testing is a negative answer. These steps include: checking whether TM2 is being used (418), checking for TM4 with RI=1 and PMI=2, 3 (420), checking for TM4 with RI=1, PMI=0, 1 (422), concluding that TM4, PMI 1, 2 are used and modulation scheme should be joint detection (424), checking for TM2 (426), MIMO equalization of TM2 (428) checking for TM4 with RI=1, PMI=0, 1 (430) and checking for TM4 with RI=1, PMI=2, 3 (432). Blocks 434 and 442 respectively represent the identification of PMI=2, 3. Box 436 and 440 represent the identification of PMI=0, 1.

The result of testing different hypothesis of the modulation scheme used by the interfering signal may be that a modulation scheme is identified (438) and used to perform interfering signal reconstruction and cancellation (444). The signal thus obtained may be then further processed by the receiving path of the receiver where data demodulation, error correction decoding, etc., may be performed to recover modulated data bits from the signal.

For simplicity, the description herein uses neighbor interference model and general description specified in 3GPP TR 36.388. Let the number of simultaneously transmitting cells be N, including the serving cell. The received signal is given by the superposition of all N cells, transmitted signals including the serving cell, $$y_k = \sum_{i=1}^{N} \sqrt{\beta_i} H_{ik} P_i x_{ik} + n_k \quad (1)$$

where $\beta_i$ represents the traffic to pilot power ratio of the signal is transmitted from $i^{th}$ cell, $H_{ik}$ is the channel matrix of the $i^{th}$ cell on $k^{th}$ RE, $x_{ik}$ is the modulated symbol transmitted by the $i^{th}$ cell on the $k^{th}$ subcarrier and assumed to have a unit power in average. In addition, k=0, 1, 2, ..., K−1, $P_i$ is the spatial precoding matrix used by the $i^{th}$ cell. K is the total number of observed subcarrier. The number of cells is N with one serving cell and N−1 interferers, and assuming that Cell 1 and 2 are the serving cell and dominant interfering cell respectively. UE attempts to cancel the data transmission on Cell 2. Signal processing algorithm attempts to extract transmission information structure of Cell 2 robustly.

Assuming that only the desired signal and one single dominant interferer is taken into account explicitly at the receiver, the received signal could be rewritten as, $$y_k = \sqrt{\beta_1} H_{1k} P_1 x_{1k} + \sqrt{\beta_2} H_{2k} P_2 x_{2k} + \sum_{i=3}^{N} \sqrt{\beta_i} H_{ik} P_i x_{ik} + n_k \quad (2)$$

Without loss of generality, assuming that serving cell signals is stronger than the interfering cell signal, E-LMMSE-IRC is applied first to suppress interference signal and to estimate the desired serving cell signal. With the assumption of estimated channel estimation, $\widehat{H_{1k}}$, $\widehat{H_{2k}}$, traffic to pilot power ratio $\hat{\beta_1}$, $\hat{\beta_2}$, and modulated symbol $\widehat{x_{1k}}$, $\widehat{x_{2k}}$ per sub-carrier for serving cell and dominate interfering cell, $\hat{P_1}$, $\hat{P_2}$, spatial pre-coding matrix, respectively. The pre-processing received symbol could be used for dominant interfere information extraction after post cancellation for desired signal, $$\tilde{y}_k = \sqrt{\beta_2} H_{2k} P_2 x_{2k} + z_k \quad (3)$$

$$z_k = \sqrt{\beta_1} H_{1k} P_1 x_{1k} - \widehat{\sqrt{\beta_1} H_{1k} P_1 x_{1k}} + \sum_{i=3}^{N} \sqrt{\beta_i} H_{ik} P_i x_{ik} + n_k \quad (4)$$

For simplicity, only one layer transmission is assumed for both target UE and interfering UE. The reliable channel estimation for both desired and interfering signals is available from reference symbols by channel estimation. The residual designed signal and all the other signals are treated as colored Gaussian and then whitened along with the background noise for interfering signal information detection. The granularity of detection is one PRB pair within each sub-frame.

In this formulation, the interfering signal is the desired signal to be blindly detected. Several conventional detection algorithms could be applied to determine the dominant interferer. A more elaborate method is to calculate the difference between the received pre-processed signal and the closest constellation point multiplied by channel estimate and the traffic to pilot power ratio of the signal. The jointly estimated mapped symbol, pre-coding matrix $\hat{P_2}$ and the traffic to pilot power ratio of the signal $\hat{\beta_2}$ are the constellation point $\widehat{x_{2k}}$ that minimizes:

$$\min_{\widehat{x_{2k}}, \hat{P_2}, \hat{\beta_2}} \| \tilde{y}_k - \sqrt{\hat{\beta_2}} \widehat{H_{2k}} \hat{P_2} \widehat{x_{2k}} \|^2 \quad (5)$$

The above minimization may be achieved by taking a hard decision. However, it is well known that the detection based on the minimum distance from the closest constellation point to the approximate interference signal $\tilde{y}_k$ is not optimal.

A brief explanation of the blind detection and IC is as following:

For simplicity, it is assumed that SLIC is the target receiver type. But the blind detection only for TMs and modulation scheme are discussed in some embodiments in this patent document. Other parameters can be omitted.

The original received signals include super-positioned desired and interfering signals. The pre-processed signal, after the desired signal is suppressed, is used as the inputs of blind detection.

The TMs and modulation scheme blind detection can be separated into two steps with independent algorithmic steps. Modulation classification can be based the assumption of fixed RI/PMI from TM detection.

Euclidean distance based ML classification can be used for modulation classification. It can be done by comparing the mean values of the distance differences in different modulation modes.

For Rank 2 transmission mode, there are two code-words. They might have different modulation schemes. Two layers blind detection could be implemented jointly with increasing complexity.

During one TTI, downlink physical layer parameters are the same on per PRB. Blind detection can be implemented on a per-PRB pair granularity in the frequency and per-TTI in the time domain.

With blindly detected interference information, the basic implementation of NAICS receiver is to make soft interference estimation of the symbols and then to cancel the interference cause by these symbols to desired symbols.

Generally speaking, modulation scheme blind detection is basic algorithm for the detection of other parameters. The ML classifier maximizes the average probability of decision error for equally probable downlink scheduling event (combination of modulation scheme and transmission mode) at each PRB per TTI. The objective function to determine modulation scheme, RI and PMI jointly can be formulated as:

$$\text{Join} = \tag{6}$$
$$\arg\max_{X \in C_n; P_2 \in \{R, PMI\}} \sum_{n_b-1}^{N_b} \ln\left\{\sum_{X \in C_n} \exp\left(-\frac{1}{\sigma^2} \| \tilde{y}_k - \sqrt{\tilde{\beta}_2} \tilde{H}_{2k} \tilde{P}_2 \tilde{x}_{2k} \|^2\right)\right\}$$

$C_n$ represents the known modulation constellation, $N_b$ represents the number of sub-carriers, R represents a rank for at least one of data. PMI represents the PMI set for the corresponding Rank. $\sigma^2$ is noise variance.

According to the above description, it can be shown that blind detection using the ML algorithm minimizes the Euclidean distance based error probability. There are no extra constraints on each individual parameter during join detection. Uncertainty of statistical distribution for the results of each blindly detected parameter may result in unstable overall performance of advanced NAIC receiver. The influence of misdetection of one parameter to others is complicated and unpredictable. In addition, the misdetection sensitivity of each detected parameter for the system performance is also different depended on the NAICS algorithm. Usually, TM and Rank decide the IC structure of algorithm and are the most critical parameters to the performance. PMI and modulation scheme affects the reconstruction of soft symbols, may allow tolerating larger uncertainty of detection. It means that ML blind detection algorithm which minimizes the distance error may not guarantee to provide the optimal overall performance of NAICS system. In addition, blindly joining the detection of multiple parameters has prohibited complexity due to large number of possible combination. Complexity-reduced sequential detection is therefore highly advantageous for practical application.

Several TMs based on CRS or DMRS are allowed for PDSCH transmission structure in LTE/LTE-A. During the channel estimation, UE may blindly guess the scrambling identity of DMRS, which is either 0 or 1, to detect the existence of such DMRS. So UE channel estimation not only provides the channel information of interfering signal on each PDSCH Resource Elements (REs), but also indicates interfering signals resulted from CRS-based or DMRS-based transmission. For CRS-based transmission, each TM is mainly characterized by different pre-coding processing and their number of layers associated with pre-coding. To reduce the amount of required parameters and complexity, Release 12 also decided that eNodeB should provide the assistance to let the UE know the possible TM set of interfering signal during the NAICS operation. So UE only need detect TMs inside of TM set blindly. Furthermore, there is no performance requirement for 4-CRS antenna ports, UE only need to support codebook-based pre-coding up to two antenna ports and one and two layers during NAICS operation. It could reduce the worst-case complexity of blind detection considerably. Generally, detection algorithm should be able to distinguish the TM of TM2, and TM4, TM6, and TM8, and TM9. However, UE is not required to cancel TM10 interference due to complexity. TM8 and TM9 are DMRS-based TMs. TM6 is a special type of closed loop spatial multiplexing of TM4, by using only one layer. So for CRS-based TM, blind detection algorithm should support to distinguish few modes i.e., TM2, TM3 and TM4 for NAICS application. Table 1 shows the PMI candidates set of TM4 at different layers.

TABLE 1 shows the PMI candidates set for TM4 at different layers.

| Codebook index | Number of layers v | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | |

While this document primarily discloses the blind detection of CRS-based transmission structure, other implementations are possible. The interferer parameters are assumed to vary on per-PRB pair granularity in the frequency and per-TTI in the time domain. Total 36 received signals from 3 OFDM symbols on each PRB-pair are used for blind detection at each TTI. Theoretically, more OFDM symbols could be used to increase the reliability of detection in cost of increasing complexity. Depending on the algorithm, elaborate algorithm might need fewer samples, and simple algorithm needs more samples. The choice of 36 samples is a result of trade-off between the achievable performance of proposed algorithm and performance required by 3GPP.

For simplicity, one can reformulate the received signal $$Y = \begin{bmatrix} y_0 \\ y_1 \end{bmatrix},$$

after the desired signal is cancelled or suppressed, for a typical 2×2 MIMO system as following, $$y_0 = [h_{00} \ h_{01}]\begin{bmatrix} x_0 \\ x_1 \end{bmatrix} + n_0 \tag{7}$$
$$y_1 = [h_{10} \ h_{11}]\begin{bmatrix} x_0 \\ x_1 \end{bmatrix} + n_1$$

where $h_{ij}$ is the channel response between $i^{th}$ receiver antenna and $j^{th}$ transmitter antenna, and $n_0$ and $n_1$ are noise on two reviver antennas respectively. $x_0$ and $x_1$ are transmitted symbols on two antenna ports, respectively, and $$x = \begin{bmatrix} x_0 \\ x_1 \end{bmatrix}$$

The received signal vector can be expressed as $$Y=Hx+n \quad (8)$$

where $$n = \begin{bmatrix} n_0 \\ n_1 \end{bmatrix}.$$

The MIMO-equalized symbols with Minimum Mean Square Error (MMSE) equalizer, can be expressed as:

$$\bar{z} = \frac{H^H H}{H^H H + N_0 I} x + n \quad (9)$$

With pre-coding vector W, using $H_{eff}=HW$ to replace H, we could have similar expression.

$$\bar{z} = \begin{pmatrix} z_0(i) \\ z_1(i) \end{pmatrix} \quad (10)$$

where $z_0(i)$ and $z_1(i)$ are MIMO-demodulated symbols on $i^{th}$ subcarrier on two antenna ports.

For reference, the various transmission modes used for the physical downlink shared channel are given in Table 2 below.

TABLE 2

Transmission modes in LTE

| Transmission mode | Transmission scheme of PDSCH |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |

In LTE, TM2 uses transmission diversity in the downlink PDSCH. It sends the same information to various antenna ports. In the case of two antenna ports, LTE transmission diversity is based on Space-Frequency Block Coding (SFBC), it implies that two consecutive modulation symbols $x_0$ and $x_1$ are mapped directly to REs that are at adjacent frequencies on the first antenna port. On the second antenna, transformed symbols $-x_1^*$ and $x_0^*$ are mapped to the corresponding REs, where "*" denotes complex conjugate, $$\begin{pmatrix} z_0(2i) & z_0(2i+1) \\ z_1(2i) & z_1(2i+1) \end{pmatrix} = \frac{1}{\sqrt{2}} \begin{pmatrix} x_0(i) & x_1(i) \\ -x_1^*(i) & x_0^*(i) \end{pmatrix} \quad (11)$$

For TM3, only Rank 2 is based on larger delay CDD, and need to be considered for blind detection. The pre-coding matrix is predefined by pre-coding cycling technique and selected from the same codebook defined for the Rank 2 of TM4. From NAICS requirement point of view, if both layers of TM3 are of same modulation scheme, then such transmission do not make any differences in the performance of blind detection and the MIMO demodulation, e.g., TM3 is exactly the same as Rank 2 of TM4. In other words, TM3 may be regarded as a subgroup of TM4; it is not necessary to distinguish the Rank 2 of TM3 and TM4, specifically.

TM detection is linked to the joint detection of PMI and RI as detection of PMI and RI can indicate the TM to be detected. It is difficult to directly estimate the TM based on the receiving signal's characteristics. The blind detection of PMI and PMI/RI can be done via comparing the measure of receiver signal covariance matrix on the data subcarriers with different reconstructed receive signal covariance matrix hypothesis derived in the assumption of using specific pre-coding parameters (PMI or PMI/RI). Each TM included in TM sets is assumed to be equally probable. UE needs to do the detection and decoding pre-coding for each TM one by one. Although, only TMs of TM2 and TM4 need to be identified, the complexity is still very high due to the number of TMs (combination of RI and PMI), and the complexity of covariance matrix calculation.

With reference to FIG. 4, to reduce the computational complexity, a sequential blind detection method for TMs, PMI and modulation schemes of interfering signals may be used. In general, the detection uncertainty of each parameter could degrade the performance of SLIC. However, the sensitivity is different. As described throughout this document, TM can be typically the most sensitive and is divided into several groups based on their similarity and sensitivity to the performance of NAICS system. The imbalance of the averaged power of MIMO-demodulated samples at two antenna ports, which is approximately equivalent to the cross-correlation between the two pre-coding vector, is used as a primary metrics for classification of those subgroup. By identifying the most sensitive group parameter, e.g., subgroup of TMs, it is easier to determine the decision threshold and improve the blind detection performance from statistical characteristic of original input samples without introduction of error propagation of detection from other parameters.

The UE extracts the interfering signal from received signal to determine whether the interfering signal on PDSCH exists. Then, blind detection is enabled if interference is detected. The detailed procedure of TM blind detection can be divided into following few exemplary steps:

Pre-Processing the Received Signal for the Input of Blind Detection

Assuming both Y and H are suitable for blind detection. Y is the interfering signal only with noise, in which the desired signal of serving cell is subtracted or suppressed from received signal by an appropriate algorithm. H is the channel estimation of interfering signal on PDSCH REs. Under the assumption of TM set for blind detection with only TM2 and TM4, there are total 7 different allowed TMs, e.g., TM2, TM4(RI=1/PMI=0), TM4(RI=1/PMI=1), TM4(RI=1/PMI=2), TM4(RI=1/PMI=3), TM4(RI=2/PMI=1), TM4(RI=2/PMI=2). MIMO-equalization is implemented on each subcarrier in a conventional way in the assumption of using one specified TM one by one. Here, $\bar{z}$ is assumed to be the demodulated samples from two antennas port. After pre-processing of blind MIMO-equalization, embodiments could have 7 groups of demodulated samples, each with 36 samples for each antenna port, along with theirs effective-SNR estimation for each codeword.

Blind Detection of Rank 2 of TM2 and TM4

As described above for TM2, the number of transmission layers is only 2, and one signal codeword is mapping to two layers with SFBC and transmits through two antennas. The PMI is predetermined. With SFBC, the two consecutive modulation symbols are mapped directly to resource elements (REs) in adjacent frequencies depending on the index of antenna port. Unlike in TM2, for TM4, a transmit symbol vector over two adjacent subcarrier is independently generated. So there is correlation between demodulated samples between adjacent subcarrier for TM2, the correlation coefficient is calculated as following for two antenna ports respectively, $$\rho_{n,0} = \frac{1}{6}\sum_{i=0}^{5} z_0(2i)z_1(2i+1) \quad (12)$$

$$\rho_{n,1} = -\frac{1}{6}\sum_{i=0}^{5} z_0(2i+1)z_1(2i)$$

where n=0, 1, 2, is the index of OFDM symbols, the averaged correlation $\rho$ over OFDM symbols, $$\rho = (\rho_{0,0} + \rho_{1,0} + \rho_{2,0} - \rho_{0,1} - \rho_{1,1} - \rho_{2,1})/6 \quad (13)$$

could be used a metrics for blindly detecting the existence of TM2, e.g., if the correlation is stronger than a predefined threshold, then TM2 is detected exclusively, otherwise declared as TM4.

Blind Detection of Rank1 and Rank2 of TM4

Pre-coding mechanism is applied at the transmission side for the purpose of beamforming to control the direction of wavefront by appropriately weighing the magnitude and phase of individual antenna signals. If $P_1$ is used at transmitter side, and different pre-coding matrix $P_2$ is used at receiver side for blind detection, it may result in the differences of demodulated samples in magnitude and phase at two receiver antenna ports. One can define $\rho_{12}$ as following to characteristics the differences:

$$\rho_{12} = (h_1^+ P_1)^* h_1^+ P_2 \quad (14)$$

e.g., the cross correlation between the two pre-coding vector and $\overline{\rho_{12}}$ indicates the averaged power of cross-correlation on all samples. For $P_1 = P_2$ case, the receiver uses the same pre-coding matrix as transmitter as in matched filter case, we can get maximum SNR of received samples. At receiver, the average power of demodulated samples at two antennas could be imbalanced if the receiver and transmitter use different pre-coding matrix during blind detection. The differences depend on the pre-coding matrix which is applied at both transmitter and receiver sides. To reduce the complexity of blind detection algorithm, we used the potential differences to explore the structure of TM and distinguish the subgroup of TMs with the help of off-line simulation.

The averaged power of MIMO demodulated samples is defined as $$\overline{\rho_0} = \frac{1}{36}\sum_{n=0}^{2}\sum_{i=0}^{11} |z_0(i)|_n^2 \quad (15)$$

$$\overline{\rho_1} = \frac{1}{36}\sum_{n=0}^{2}\sum_{i=0}^{12} |z_1(i)|_n^2$$

The expected values of $\overline{\rho_0}$ and $\overline{\rho_1}$, which correspond to different $\{P_1, P_2\}$ pairs, are also pre-simulated and saved as a look-up-table. Table 3 below shows an example.

TABLE 3

| TM4(RI/PMI) | Rx(1/0) | | Rx(1/1) | | Rx(1/2) | | Rx(1/3) | | Rx(2/1) | | Rx(2/2) | |
|---|---|---|---|---|---|---|---|---|---|---|---|---|
| | $\overline{\rho_0}$ | $\overline{\rho_1}$ | $\overline{\rho_0}$ | $\overline{\rho_1}$ | $\overline{\rho_0}$ | $\overline{\rho_1}$ | $\overline{\rho_0}$ | $\overline{\rho_1}$ | $\overline{\rho_0}$ | $\overline{\rho_1}$ | $\overline{\rho_0}$ | $\overline{\rho_1}$ |
| Tx(1/0) | 1.0 | 1.0 | 1.0 | 1.0 | 0.0 | 2.0 | 2.0 | 0.0 | 2.0 | 0.0 | 1.0 | 1.0 |
| Tx(1/1) | 1.0 | 1.0 | 1.0 | 1.0 | 0.0 | 2.0 | 2.0 | 0.0 | 0.0 | 2.0 | 1.0 | 1.0 |
| Tx(1/2) | 0.0 | 2.0 | 0.0 | 2.0 | 0.0 | 4.0 | 0.0 | 0.0 | 1.0 | 1.0 | 2.0 | 0.0 |
| Tx(1/3) | 2.0 | 0.0 | 2.0 | 0.0 | 0.0 | 0.0 | 4.0 | 0.0 | 1.0 | 1.0 | 0.0 | 2.0 |
| Tx(2/1) | 1.0 | 1.0 | 1.0 | 1.0 | 0.0 | 2.0 | 2.0 | 0.0 | 1.0 | 1.0 | 1.0 | 1.0 |
| Tx(2/2) | 1.0 | 1.0 | 1.0 | 1.0 | 0.0 | 2.0 | 2.0 | 0.0 | 1.0 | 1.0 | 1.0 | 1.0 |

Now for blind detection, embodiments can have 6-pairs of averaged power from demodulated samples. After normalization, the 6-pairs of averaged power correlated with each raw of the table to find the best matching of row in the table to identify $P_1$ as RI/PMI used at transmitter side. The table suggests that TM could be divided into 4 subgroup based on the similarity of PMI and transmission characteristics. For simplicity, four subgroup of TM can be used, e.g., $g_1=\{TM2\}$, $g_2=\{TM4, RI=1, PMI=0 \text{ and } 1\}$, $g_3=\{TM4, RI=1, PMI=2 \text{ and } 3\}$ and $g_4=\{TM4, RI=2, PMI=1 \text{ and } 2\}$.

The following observations are relevant:

(1) $g_3$ is easy to be distinguished with $g_2$ and $g_4$ with high reliability, (2) $g_2$ and $g_4$ could be distinguished by checking the difference of Rx(2/1) with low reliability.

(3) However, it could be improved by checking the correlation between $z_{0(i)}$ and $z_{1(i)}$. For Rank 1 of TM4, $x_{0(i)} = x_{1(i)}$ is applied for transmission diversity.

(4) For $g_4$, unfortunately, the averaged powers in all cases are the same for both PMI=1 and PMI=2. One possible strategy is to apply Euclidean distance-based PMI and modulation scheme joining detection to distinguish PMIs. Embodiments can use the best metrics of modulation schemes for both codeword in jointly detecting modulation scheme and PMI. In addition, the modulation scheme used in the LTE downlink may include QPSK, 16QAM and 64QAM for each codeword.

Sequential Detection Strategy

The blind detection algorithm can be per TTI-based by using, for example, total 36 REs from 3 OFDM symbols of one PRB. There is no assumption on the dependence of TM between TTIs. Assuming the interfering UE is working in closed-loop mode and scheduling downlink TM following the feedback CQI, TM to be blindly detected unlikely always changes at each TTI due to relatively slow channel changes in most case. The order of subgroup classification could be adjusted dynamically based the blindly detected TM of previous TTI.

The following sequential strategy can be used:

If TM of previous TTI is $g_1$(TM2), the $g_1$ is identified at first step, following by the identification for $g_3$, then for $g_2$ and $g_4$.

If TM of previous TTI is TM4, then $g_3$, is identified first step, following by the identification for $g_2$ and $g_4$, $g_1$ and $g_4$ distinguish at the last steps.

By taking advantage of possible correlation of scheduled TM between TTI in practical scenario, the detection complexity for TM subgroup identification may be reduced by decreasing the sequential detection depth without loss the performance.

In summary, a complexity-reduced method for blind identification of the transmission structure of interfering signal is disclosed as a pre-processing step for interferer reconstruction in a practical interference limited system for receiver with IC capability. In some embodiments, sequential detection in the order of the most sensitive parameter first is performed for optimal IC performance by taking a measure to avoid error propagation from less sensitive parameters, and prioritizing on the achievable estimation accuracy of the most sensitive parameters. The estimated transmission structure of TM can be classified into several subgroup based on their similarity of PMI and transmission characteristics. The averaged power of demodulated samples at two antenna ports after MIMO-equalizer hypothesis can be derived in the assumption of using specific pre-coding parameters (e.g., PMI or PMI/RI). The expected average power of cross correlations between all possible two pre-coding vectors can also be pre-simulated and saved as a look-up-table. The similarity between the normalized powers from two antenna ports and pre-calculated cross correlation versus different TMs can be used as metrics for subgroup classification of TMs. In addition, the order of subgroup classification can be adapted dynamically based on the blindly detected TM of previous TTI by taking advantage of possible correlation of TM scheduling between TTI in practical application to reduce the detection complexity without loss the performance.

Figure 5:
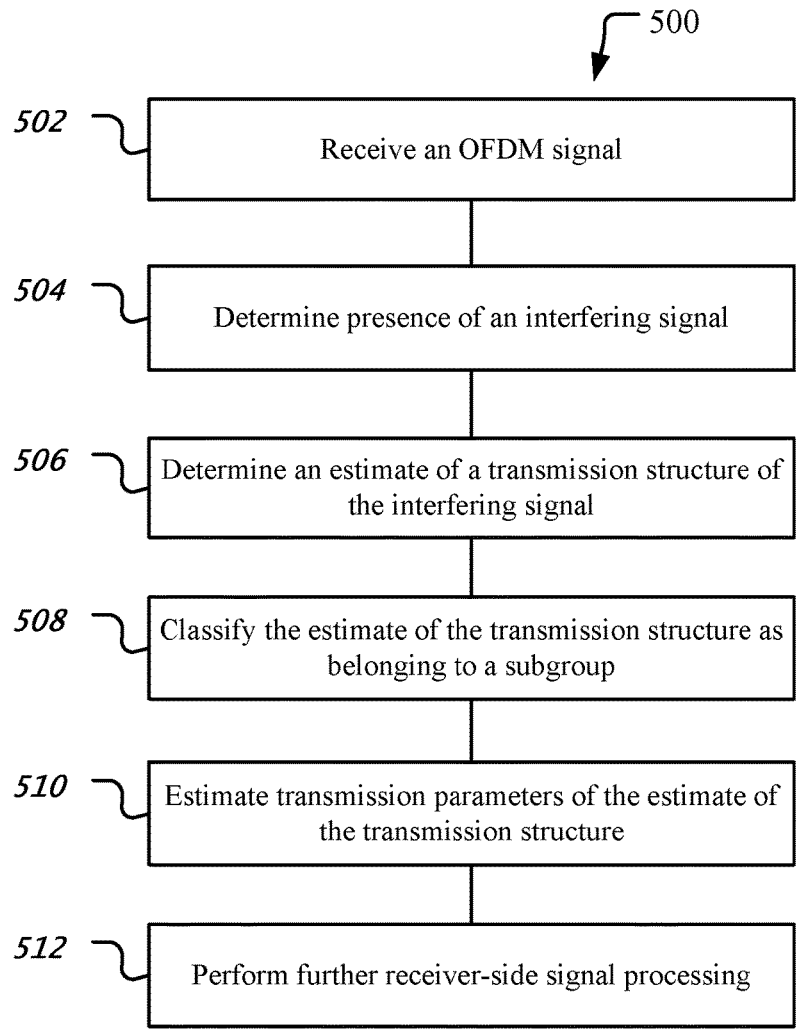
FIG. 5 shows a flowchart of an example method of wireless communications.

FIG. 5 is a flowchart of a method of wireless communication. A method of wireless signal processing performed at a receiver in a wireless network, comprising:

The method 500 includes, at 502, receiving, by a wireless receiver, an orthogonal frequency division multiplexing (OFDM) signal on a shared downlink channel from the wireless network. As disclosed in this document, the shared downlink channel may be shared by two or more neighboring wireless cells (eNodeB's of these cells) for downlink data transmissions on PDSCH.

The method 500 includes, at 504, determining that an interfering signal is present, along with a serving cell signal, in the OFDM signal on the shared downlink channel. In some embodiments, the determination that an interfering signal is present may be made using a quality measurement of the desired signal. For example, the differences of received signal power, with or without interference suppression, may be used to detect the presence of an interfering signal.

The method 500 includes, at 506, determining an estimate of a transmission structure of the received interfering signal. As disclosed throughout the present document, the transmission structure can be defined by a plurality of transmission parameters. The transmission parameters may include a parameter that is configured by a higher layer message and/or a parameter that is dynamically signaled during a data transmission session and/or a parameter that is related to a network operator's deployment. Examples of parameters configured by a higher level message may include the transmission mode, cell identification, identification of subframes of a multicast-broadcast single frequency network, if used for downlink transmission, identification of the antenna ports used for cell-specific reference signals (CRS), and so on. Examples of dynamically signaled parameters include precoding matrix index, rank indicator, modulation and coding scheme, resource allocation to transmissions, demodulation reference signal, and so on. Examples of parameters related to the network deployment may include cyclic prefix length, the technique used for transmitter synchronization, subframe/slot alignment, and so on.

The method 500 includes, at 508, classifying the estimate of the transmission structure as belonging to a subgroup from a plurality of possible subgroups in a dynamic order. The dynamic order may be determined at run-time depending on the transmission structure estimated in the previous TTI. For example, FIG. 4 depicts a decision process in which the initial determination of whether to first estimate transmission structure of the interfering signal using TM2 assumption or TM4 assumption.

The method 500 includes, at 510, estimating, in a priority order, at least some of the plurality of transmission parameters of the estimate of the transmission structure. As disclosed throughout the document, the sensitivity of the transmission parameters to the inaccuracy of determination of other parameters may be used as a criteria, so that the errors in parameter estimations do not excessively propagate.

The method 500 includes, at 512, performing further receiver-side processing of the serving cell signal by subtracting contribution of the interfering signal from the OFDM signal based on the estimate of the transmission structure and a result of the estimating step. The processing may include error correction, data demodulation, etc., to recover information bits from the estimate of the serving cell signal.

Figure 6:
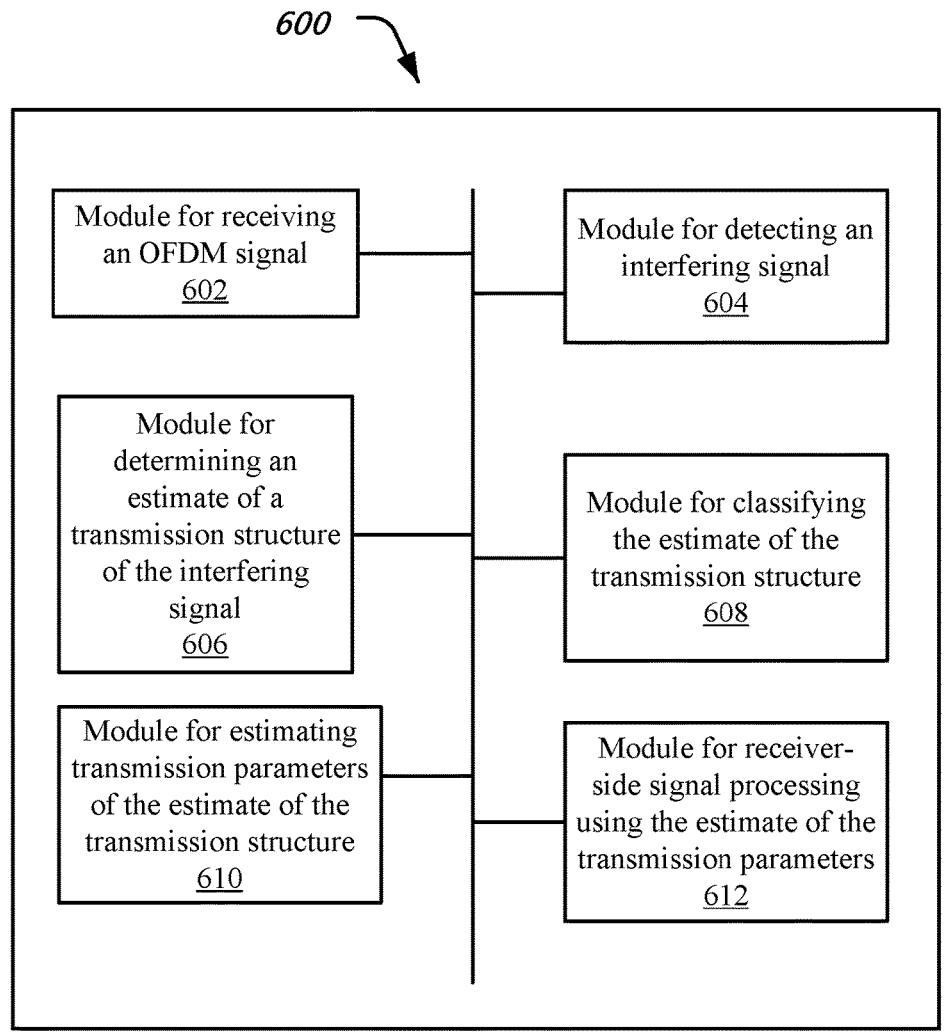
FIG. 6 shows a block diagram example of a wireless communication apparatus.

FIG. 6 is a block diagram of a wireless communication apparatus 600. The apparatus 600 may be a UE.

The apparatus 600 may include a module 602 for receiving, by a wireless receiver, an orthogonal frequency division multiplexing (OFDM) signal on a shared downlink channel from the wireless network. The OFDM signal reception may include operations such as frequency downconversion, low-pass filtering, analog to digital conversion, Fourier transforming the digital data, removal of guard interval, equalization of signal and optionally pilot extraction, and so on.

The apparatus 600 may include a module 604 for determining that an interfering signal is present, along with a serving cell signal, in the OFDM signal on the shared downlink channel. As disclosed herein, signal power may be estimated by the module, compared with an expected power and a threshold-based decision may be made regarding presence of the interfering signal.

The apparatus 600 may include a module 606 for determining an estimate of a transmission structure of the received interfering signal, wherein the transmission structure is defined by a plurality of transmission parameters. The module 602 may implement some of the steps discloses with respect to methods 400 and 500.

The apparatus 600 may include a module 608 for classifying the estimate of the transmission structure as belonging to a subgroup from a plurality of possible subgroups in a dynamic order. The module 604 may implement some of the steps discloses with respect to methods 400 and 500.

The apparatus 600 may include a module 610 for estimating, in a priority order, at least some of the plurality of transmission parameters of the estimate of the transmission structure. Various examples of the priority order are disclosed throughout the present document.

The apparatus 600 may include a module 612 for performing further receiver-side processing of the serving cell signal by subtracting contribution of the interfering signal from the OFDM signal based on the estimate of the transmission structure and a result of the module 610 for estimating. The module 612 may implement, e.g., error correction, parallel to serial conversion, and so on. The apparatus 600 and modules 602 to 612 may further implement techniques described in the present document.

In some embodiments, software code may be stored on a computer-readable program medium. The code may include instructions which, when read and executed by a processor, cause the processor to implement a method disclosed herein, e.g., the method 400 or 500.

The disclosed techniques may be embodied in a wireless communication apparatus that includes a memory for storing data and instructions, a processor, one or more antenna, and a radio frequency receiver. The wireless communication apparatus may receive signals at the one or more antenna and recover information bits from the received signal by using one or more techniques described in the present document.

Although example embodiments have been described in connection with specific NAICS application for instructional purposes, it is not limited thereto. For example, method is applicable for the transmission structure estimation of multi-user successive IC in the non-orthogonal multiple access for future radio access. Accordingly, various modifications, adaptations, and combinations of various features of the description can be practiced without departing from the scope of the invention.

As previously discussed, in order to cope with the exponential growth of data services in wireless system, new wireless deployments can benefit from a more flexible and aggressive in-spectrum management to improve cell spectral efficiency. It is shown that spatial frequency reuse by adding more cells offers a larger capacity gain compared to the increased spatial order or increased spectral bandwidth. Deployments of LTE-Advanced and beyond are expected to utilize spectrum efficiency by using small cell technology and is designed so-called frequency reuse of one where all the cells use the same frequency. However, this leads to strong inter-cell interference on edges and suffers performance degradation.

As discussed in the present document, the Network Assisted Interference Cancellation and Suppression (NA-ICS) has been proposed in 3GPP LTE-A Release 12 to combat the interference at least partially and considerably enhanced the performance of cell-edge User Equipment (UE) in the interference limited system. However, the enhancement is under the assumption that the knowledge of interference transmission is known to the user equipment (UE) by network broadcast signaling or UE blind detection. The detailed parameters of knowledge include UE-specified traffic-to-pilot power ratio (Pa/Pb), Rank Indicator (RI), Pre-coding Matrix Indicator (PMI), modulation scheme, perhaps more parameters depending on the advanced receiver's type. Algorithm such as Symbol-Level Interference Cancellation (SLIC), Reduced complexity Maximum Likelihood (R-ML) and CodeWord Interference Cancellation (CWIC), could be used as target receiver's types, and were evaluated by 3GPP under NAICS environment thoroughly. Thereafter, CWIC was dropped from consideration in 3GPP due to its high complexity, and require tighter parameters.

It will further be appreciated that SLIC is an attractive algorithm due to its achievable trade-off among the performance gain, complexity and required assistance parameters. SLIC is a successive IC-based receiver which operates by successively applying linear detection, reconstruction and cancellation of interfering signal at symbols level. The performance of SLIC receiver depends on how good the interfering signal is reconstructed. For effective use, SLIC uses reliable parameters of interfering signals, and few of them, at least Transmission Mode (TM), modulation scheme, had to be blindly detected because the network cannot signal all required parameters to UE due to limited network resource. In some embodiments, an SLIC algorithm may be used to perform receiver-side processing, for example, as part of step 512 in FIG. 5.

The blind detection operation can be a challenging pre-processing operation because the received signals used for blind detection is super-positioned by, or a combination of, both desired signal and interfering signal. Ideally, multiple parameters could be optimally detected jointly in one ML framework by minimizing the average probability of decision error with the assumption that the modes of allowed parameter combination are equal probability. But the optimality comes with high computational complexity due to large number of modes and need to be implemented on per-PRB and per Transmission Time Interval (TTI) granularity in application. It is evitable to reduce computation complexity for practical applications.

It will further be appreciated that the techniques disclosed in the present document, among other aspect, provide for sequential detection in an order of sensitivity of results to various parameters. For example, the most sensitive parameter may be estimated first for optimal IC performance by taking a measure to avoid error propagation from less sensitive parameters. Put differently, embodiments may prioritize on the achievable estimation accuracy of the most sensitive parameters.

Transmission structures of TM may be classified into several subgroup based on their similarity of PMI and transmission characteristics. The averaged power of demodulated samples at two antenna ports after MIMO-equalizer hypothesis derived in the assumption of using specific pre-coding parameters (e.g., PMI or PMI/RI). The cross correlations between all possible two pre-coding vectors may be pre-simulated and saved as a look-up-table. The similarities between the normalized powers from two antenna ports and pre-calculated cross correlation versus different TMs may be used as metrics for subgroup classification of TMs. In addition, the order of subgroup classification may also be adapted dynamically based the blindly detected TM of previous TTI by taking advantage of possible correlation of TM scheduling between TTIs in practical application to reduce the detection complexity without loss the performance.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of wireless signal processing performed at a receiver in a wireless network, comprising:
    receiving, by a wireless receiver, an orthogonal frequency division multiplexing (OFDM) signal on a shared downlink channel from the wireless network;
    determining that an interfering signal is present, along with a serving cell signal, in the OFDM signal on the shared downlink channel;
    determining an estimate of a transmission structure of the received interfering signal, wherein the transmission structure is defined by a plurality of transmission parameters;
    classifying the estimate of the transmission structure as belonging to a subgroup from a plurality of possible subgroups in a dynamic order;
    estimating, in a priority order, at least some of the plurality of transmission parameters of the estimate of the transmission structure; and
    performing further receiver-side processing of the serving cell signal by subtracting contribution of the interfering signal from the OFDM signal based on the estimate of the transmission structure and a result of the estimating step.

2. The method of claim 1, wherein the dynamic order for classifying the estimated transmission structure is determined at run-time depending on a transmission structure estimation outcome of signals received in a previous transmission time interval.

3. The method of claim 1, wherein the priority order for the estimating step is responsive to a sensitivity of results of the estimating step with respect to the plurality of transmission parameters.

4. The method of claim 1, wherein the classifying step comprises:
    comparing similarity between signal power received on antennas of the wireless receiver with entries from a look-up table, wherein the entries from the look-up table include simulated cross-correlations between combination of pre-coding vectors used for signal transmission in the wireless network.

5. The method of claim 1, wherein the performing the further receiver-side processing includes:
    performing a symbol-level interference cancellation (SLIC) algorithm.

6. The method of claim 1, wherein the plurality of transmission parameters includes:
    any one or more of a parameter that is configured by a higher layer message, a parameter that is dynamically signaled during a data transmission session and a parameter that is related to a network operator's deployment.

7. The method of claim 1, wherein the estimating of at least some of the plurality of transmission parameters includes:
    estimating a modulation scheme of the received interfering signal by performing blind estimation to estimate constellation points of received data symbols.

8. The method of claim 1, wherein the serving cell signal comprises:
    a reference signal known a priori to the wireless receiver.

9. The method of claim 1, wherein the determining the estimate of the transmission structure includes:

using a difference between an average power of symbols received at different antenna ports of the wireless receiver.

10. A non-transitory computer-readable program medium storing computer-executable instructions, which when executed by a processor, causing the processor to implement a method of wireless signal processing performed at a receiver in a wireless network, comprising:
receiving, by a wireless receiver, an orthogonal frequency division multiplexing (OFDM) signal on a shared downlink channel from the wireless network;
determining that an interfering signal is present, along with a serving cell signal, in the OFDM signal on the shared downlink channel;
determining an estimate of a transmission structure of the received interfering signal, wherein the transmission structure is defined by a plurality of transmission parameters;
classifying the estimate of the transmission structure as belonging to a subgroup from a plurality of possible subgroups in a dynamic order;
estimating, in a priority order, at least some of the plurality of transmission parameters of the estimate of the transmission structure; and
performing further receiver-side processing of the serving cell signal by subtracting contribution of the interfering signal from the OFDM signal based on the estimate of the transmission structure and a result of the estimating step.

11. The non-transitory computer-readable program of claim 10, wherein the dynamic order for classifying the estimated transmission structure is determined at run-time depending on a transmission structure estimation outcome of signals received in a previous transmission time interval.

12. The non-transitory computer-readable program of claim 10, wherein the priority order for the estimating step is responsive to a sensitivity of results of the estimating step with respect to the plurality of transmission parameters.

13. The non-transitory computer-readable program of claim 10, wherein the classifying step comprises:
comparing similarity between signal power received on antennas of the wireless receiver with entries from a look-up table, wherein the entries from the look-up table include simulated cross-correlations between combination of pre-coding vectors used for signal transmission in the wireless network.

14. The non-transitory computer-readable program of claim 10, wherein the performing the further receiver-side processing includes:
performing a symbol-level interference cancellation (SLIC) algorithm.

15. The non-transitory computer-readable program of claim 10, wherein the plurality of transmission parameters includes:
any one or more of a parameter that is configured by a higher layer message, a parameter that is dynamically signaled during a data transmission session and a parameter that is related to a network operator's deployment.

16. The non-transitory computer-readable program of claim 10, wherein the estimating of at least some of the plurality of transmission parameters includes:
estimating a modulation scheme of the received interfering signal by performing blind estimation to estimate constellation points of received data symbols.

17. The non-transitory computer-readable program of claim 10, wherein the serving cell signal comprises:
a reference signal known a priori to the wireless receiver.

18. The non-transitory computer-readable program of claim 10, wherein the determining the estimate of the transmission structure includes:
using a difference between an average power of symbols received at different antenna ports of the wireless receiver.

19. A wireless communication receiver, comprising:
a memory, a processor, and one or more antenna ports, wherein the one or more antenna ports receive an orthogonal frequency division multiplexing (OFDM) signal, and wherein the processor reads instructions from the memory and causes the wireless communication receiver to:
receive the orthogonal frequency division multiplexing (OFDM) signal on a shared downlink channel from the wireless network;
determine that an interfering signal is present, along with a serving cell signal, in the OFDM signal on the shared downlink channel;
determine an estimate of a transmission structure of the received interfering signal, wherein the transmission structure is defined by a plurality of transmission parameters;
classify the estimate of the transmission structure as belonging to a subgroup from a plurality of possible subgroups in a dynamic order;
estimate, in a priority order, at least some of the plurality of transmission parameters of the estimate of the transmission structure; and
perform further receiver-side processing of the serving cell signal by subtracting contribution of the interfering signal from the OFDM signal based on the estimate of the transmission structure and a result of the at least some of the plurality of transmission parameters.

20. The wireless communication receiver of claim 19, wherein the dynamic order to classify the estimated transmission structure is configured to be determined at run-time depending on a transmission structure estimation outcome of signals received in a previous transmission time interval.

21. The wireless communication receiver of claim 19, wherein the priority order for the estimating step is responsive to a sensitivity of results of the estimating step with respect to the plurality of transmission parameters.

22. The wireless communication receiver of claim 19, wherein the wireless receiver is configured to classify the estimate of the transmission structure by comparing similarity between signal power received on antennas of the wireless receiver with entries from a look-up table, wherein the entries from the look-up table include simulated cross-correlations between combination of pre-coding vectors used for signal transmission in the wireless network.

23. The wireless communication receiver of claim 19, wherein the wireless receiver is configured to perform the further receiver-side processing by performing a symbol-level interference cancellation (SLIC) algorithm.

24. The wireless communication receiver of claim 19, wherein the plurality of transmission parameters includes:
any one or more of a parameter that is configured by a higher layer message, a parameter that is dynamically signaled during a data transmission session and a parameter that is related to a network operator's deployment.

25. The wireless communication receiver of claim 19, wherein the wireless receiver is configured to estimate at least some of the plurality of transmission parameters by estimating a modulation scheme of the received interfering signal by performing blind estimation to estimate constellation points of received data symbols.

26. The wireless communication receiver of claim 19, wherein the serving cell signal comprises:
   a reference signal known a priori to the wireless receiver.

27. The wireless communication receiver of claim 19, wherein the wireless receiver is configured to determine the estimate of the transmission structure by using a difference between an average power of symbols received at different antenna ports of the wireless receiver.

* * * * *

UNITED STATES PATENT AND TRADEMARK OFFICE
CERTIFICATE OF CORRECTION

PATENT NO. : 10,177,942 B2
APPLICATION NO. : 15/849551
DATED : January 8, 2019
INVENTOR(S) : Xing Qian, LiJuan Zhao and JunLing Zhang It is certified that error appears in the above-identified patent and that said Letters Patent is hereby corrected as shown below:

In the Specification

In Column 11, Line 4, delete " $\arg \max_{X \in C_n; P_2 \in \{R, PMI\}} \sum_{n_b=1}^{N_b} \ln\left\{\sum_{X \in C_n} \exp\left(-\frac{1}{\sigma^2} \| \tilde{y}_k - \sqrt{\beta_2} \tilde{H}_{2k} \tilde{P}_2 \tilde{x}_{2k} \|^2\right)\right\}$ "
and insert -- $\arg max_{X \in C_n; P_2 \in \{R, PMI\}} \sum_{n_b=1}^{N_b} \ln\left\{\sum_{X \in C_n} exp(-\frac{1}{\sigma^2} \| \tilde{y}_k - \sqrt{\beta_2} \widehat{H}_{2k} \widehat{P}_2 \widehat{x}_{2k} \|^2 )\right\}$ --,
therefor.

Signed and Sealed this
Third Day of November, 2020

Andrei Iancu
*Director of the United States Patent and Trademark Office*